United States Patent
Suzuki

(10) Patent No.: US 10,598,076 B2
(45) Date of Patent: Mar. 24, 2020

(54) FLOW CONTROL VALVE

(71) Applicant: AISIN SEIKI KABUSHIKI KAISHA, Kariya-shi, Aichi-ken (JP)

(72) Inventor: Hideyuki Suzuki, Toyohashi (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/034,798

(22) Filed: Jul. 13, 2018

(65) Prior Publication Data
US 2019/0040788 A1 Feb. 7, 2019

(30) Foreign Application Priority Data
Aug. 2, 2017 (JP) .................. 2017-150015

(51) Int. Cl.
| | |
|---|---|
| *F01P 7/14* | (2006.01) |
| *F16K 1/06* | (2006.01) |
| *F16K 27/02* | (2006.01) |
| *F16K 31/50* | (2006.01) |
| *F01P 5/10* | (2006.01) |
| *F16K 11/22* | (2006.01) |
| *F16K 31/04* | (2006.01) |

(52) U.S. Cl.
CPC ....... *F01P 7/14* (2013.01); *F01P 5/10* (2013.01); *F16K 1/06* (2013.01); *F16K 11/22* (2013.01); *F16K 27/02* (2013.01); *F16K 31/04* (2013.01); *F16K 31/508* (2013.01); *F01P 2007/146* (2013.01)

(58) Field of Classification Search
CPC .......... F01P 7/14; F01P 5/10; F01P 2007/146; F16K 27/02; F16K 1/06; F16K 31/508; F16K 11/22; F16K 31/04
See application file for complete search history.

(56) References Cited

U.S. PATENT DOCUMENTS 5,826,282 A * 10/1998 Matsumoto ............... E03D 9/08
4/420.4
2006/0005789 A1 * 1/2006 Miura ....................... F01P 7/16
123/41.1
2015/0028245 A1 * 1/2015 Yamada ................ F16K 31/126
251/367

FOREIGN PATENT DOCUMENTS

JP 2006-029113 A 2/2006
JP 2008-286311 A 11/2008

* cited by examiner

*Primary Examiner* — Jacob M Amick
*Assistant Examiner* — Charles Brauch
(74) *Attorney, Agent, or Firm* — Buchanan Ingersoll & Rooney PC

(57) ABSTRACT

A flow control valve includes a housing including an inflow port and an outflow port which communicates with the inflow port, a valve body housed in the housing and formed in a cylindrical form, the valve body allowing and prohibiting a fluid to flow between the inflow port and the outflow port by moving in an axial direction, an actuator moving the valve body in the axial direction, and a partition wall arranged between the valve body and the inflow port and causing a flow path from the inflow port to the valve body to be branched towards an outer peripheral side of the valve body.

8 Claims, 4 Drawing Sheets

FLOW CONTROL VALVE

CROSS REFERENCE TO RELATED APPLICATIONS

This application is based on and claims priority under 35 U.S.C. § 119 to Japanese Patent Application 2017-150015, filed on Aug. 2, 2017, the entire content of which is incorporated herein by reference.

TECHNICAL FIELD

This disclosure generally relates to flow control valve.

BACKGROUND DISCUSSION

As an apparatus for cooling an engine mounted at a vehicle such as an automobile, for example, a water-cooling type engine cooling apparatus circulating cooling water which is cooled at a radiator to the engine is known. The cooling water is circulated by a water pump, for example. A flow rate of cooling water is controlled by a flow control valve disposed at a flow path through which the cooling water flows.

JP2008-286311A which is hereinafter referred to as Reference 1 discloses a flow control valve controlling a flow rate of cooling water which cools an engine. The flow control valve includes a valve body in a cylindrical form. An up-down movement of the valve body controls the flow rate of the cooling water flowing through plural ports provided at a housing. The cylindrical valve body is driven by a motor, for example.

According to a flow control valve including a cylindrical valve body, highly pressurized cooling water may be normally supplied to an outer peripheral surface of the valve body from a water pump during a transition of the flow control valve from a closed state to an open state. Therefore, the water pressure of the cooling water may be a large load upon movement of the valve body. An actuator that drives the valve body thus needs sufficient driving force or driving torque, for example, for moving the valve body against the load caused by the water pressure. As a result, a cost increase resulting from a construction of a mechanism for driving the valve body, i.e., an increase in size of the actuator, for example, may be inevitable.

In order to overcome the above, according to a flow control valve disclosed in JP2006-29113A which is hereinafter referred to as Reference 2, a pressure regulation passage is provided so as to regulate pressures at axially opposed sides of a cylindrical valve body to be equal to each other. As a result, a driving load of an actuator is minimized in a case where the cylindrical valve body moves in an axial direction to thereby achieve a decrease in size of the actuator.

The flow control valve disclosed in Reference 2 includes two cylindrical valve bodies within a housing, specifically, a valve body for a radiator flow control and a valve body for a bypass flow control. The two valve bodies are constructed so that moving directions thereof are orthogonal to each other. Thus, the pressure regulation passage is arranged along each of the moving directions of the valve bodies, which may lead to a complicated construction. In addition, because the two valve bodies including the moving directions orthogonal to each other are provided within the housing, a portion of the flow control valve other than the portion where the actuator is provided increases in size. Further, according to the flow control valve disclosed in Reference 2, an outer peripheral surface of the cylindrical valve body is configured to slidably move relative to an inner surface of the housing. Thus, a seal member provided between the outer peripheral surface of the cylindrical valve body and the inner surface of the housing may be abraded, which may lead to water leakage therefrom.

A need thus exists for a flow control valve which is not susceptible to the drawback mentioned above.

SUMMARY

According to an aspect of this disclosure, a flow control valve includes a housing including an inflow port and an outflow port which communicates with the inflow port, a valve body housed in the housing and formed in a cylindrical form, the valve body allowing and prohibiting a fluid to flow between the inflow port and the outflow port by moving in an axial direction, an actuator moving the valve body in the axial direction, and a partition wall arranged between the valve body and the inflow port and causing a flow path from the inflow port to the valve body to be branched towards an outer peripheral side of the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
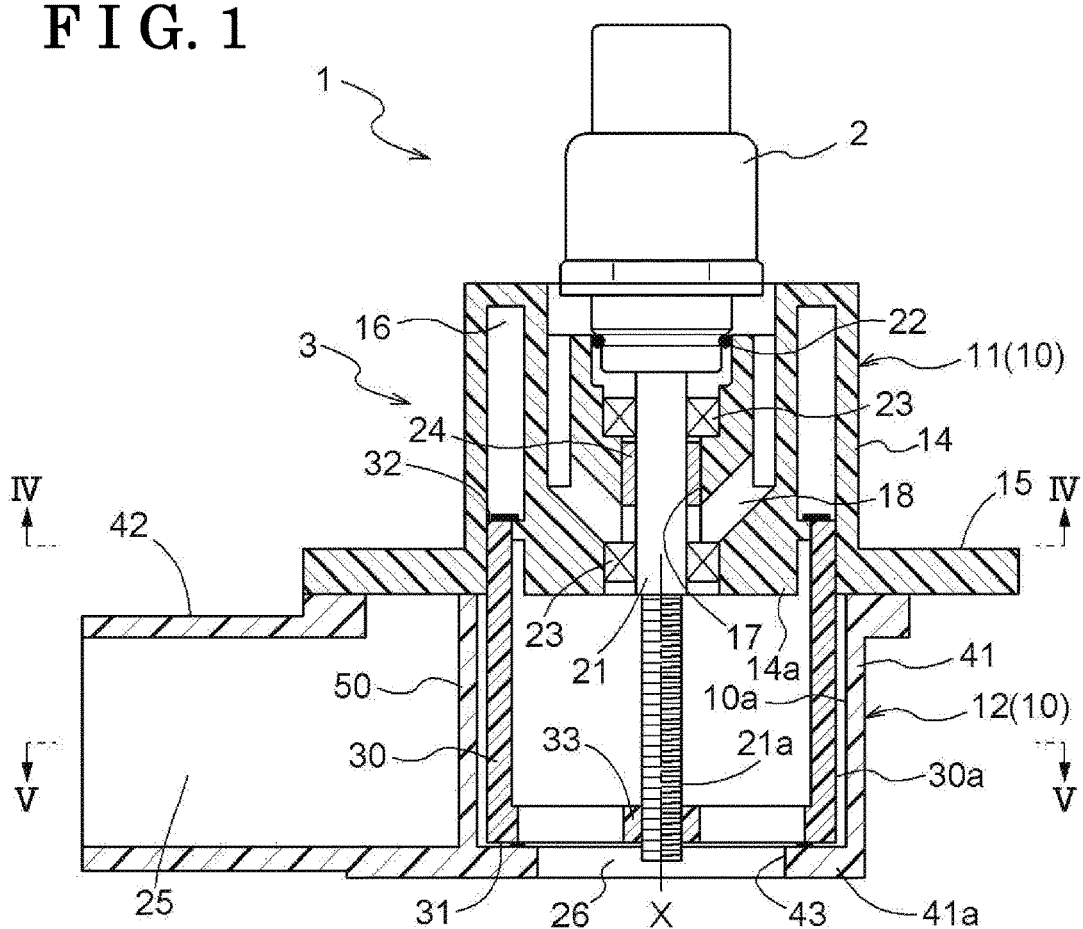
FIG. 1 is a cross-sectional view illustrating a closed state of a flow control valve disclosed here.

An embodiment in this disclosure is explained with reference to the attached drawings.

A flow control valve 1 illustrated in FIGS. 1 to 4 is employed at a water-cooling type engine cooling apparatus which cools an engine (internal combustion engine) mounted at a vehicle such as an automobile, for example. The flow control valve 1 is arranged at a flow path through which cooling water (serving as an example of fluid) circulates and flows by a water pump to control and regulate a flow rate of cooling water.

The flow control valve 1 includes a motor portion 2 (serving as an example of an actuator) and a valve portion 3. The motor portion 2 is configured by a stepping motor, for example. The valve portion 3 includes a housing 10 and a valve body 30 housed in the housing 10. The housing 10 includes a first housing 11 and a second housing 12.

The first housing 11 is provided abutting on the motor portion 2. The second housing 12 is mounted at the first housing 11 at a side opposite to the motor portion 2. The valve body 30 is formed in a cylindrical form and is movable between the first housing 11 and the second housing 12. The first housing 11 includes a shaft accommodation portion 14 and a flange portion 15. The shaft accommodation portion 14 includes an annular groove portion 16 to which the cylindrical valve body 30 is retracted and received in a case where the flow control valve 1 is in an open state (i.e., the valve body 30 is at an open position). A shaft holding portion 14a is provided at an inner circumferential side of the groove portion 16 at the shaft accommodation portion 14 for holding a shaft 21 in a rotatable manner, the shaft 21 protruding from the motor portion 2. A penetration bore 17 is provided at an axis portion of the shaft holding portion 14a so that the shaft 21 extends through the penetration bore 17. An O-ring 22, an oil seal 23 and a sliding bearing 24 are arranged between the penetration bore 17 and the shaft 21. A bore portion 18 for releasing vapor and water, for example, is provided extending towards the motor portion 2 from the penetration bore 17.

The second housing 12 includes an accommodation portion 41 which accommodates the valve body 30 in a case where the flow control valve 1 is in a closed state (i.e., the valve body 30 is at a closed position) and a tubular portion 42 connected laterally to the accommodation portion 41 so as to communicate therewith. An inflow port 25 and an outflow port 26 which communicates with the inflow port 25 via the accommodation portion 41 are provided at the second housing 12. The inflow port 25 is provided inside the tubular portion 42 and the outflow port 26 is constituted by an opening 43 provided at a bottom portion 41a of the accommodation portion 41.

Figure 2:
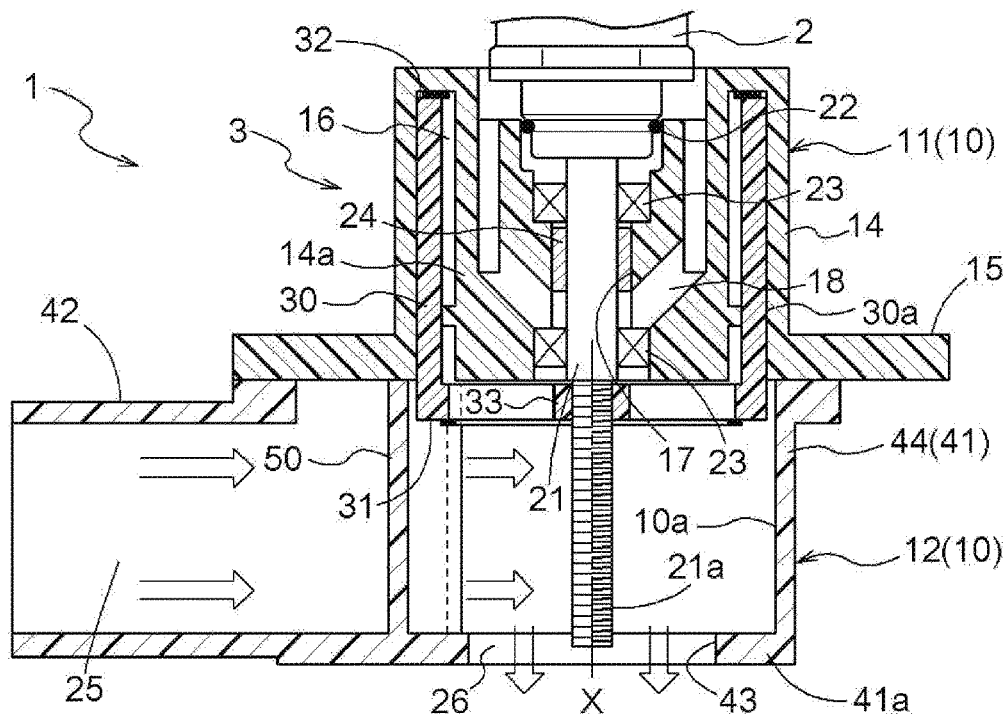
FIG. 2 is a cross cross-sectional view illustrating an open state of the flow control valve.
Figure 5:
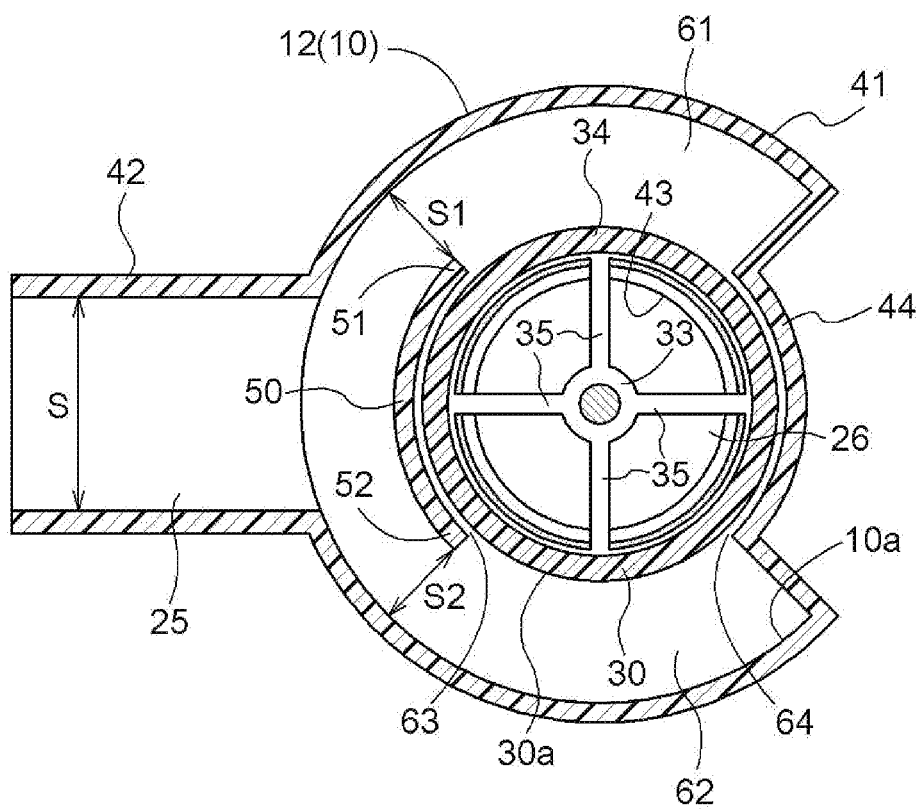
FIG. 5 is a cross-sectional view taken along a line V-V in FIG. 1.

The valve body 30 allows or prohibits the cooling water to flow between the inflow port 25 and the outflow port 26 by moving in an axial direction. The valve body 30 includes opposed end surfaces in a direction of an axis X (i.e., in the axial direction), specifically, includes a first end surface 31 positioned facing the outflow port 26 and a second end surface 32 positioned at an opposite side of the outflow port 26. As illustrated in FIGS. 1 and 2, an annular portion 33 with a smaller diameter is provided at a substantially center portion of the first end surface 31. As illustrated in FIG. 5, the annular portion 33 and a lower portion of a cylindrical portion 34 of the valve body 30 are connected to each other by linear connecting portions 35. Specifically, four connecting portions 35 are provided extending from the annular portion 33 to the cylindrical portion 34 in a state where each portion between adjacent connecting portions 35 is opened. The shaft 21 protruding from the motor portion 2 is connected to the valve body 30. The annular portion 33 includes an internally threaded portion at an inner peripheral surface while an end portion 21a of the shaft 21 includes an externally threaded portion. A part of the end portion 21a of the shaft 21 is meshed with the internally threaded portion of the inner surface of the annular portion 33 of the valve body 30.

Figure 3:
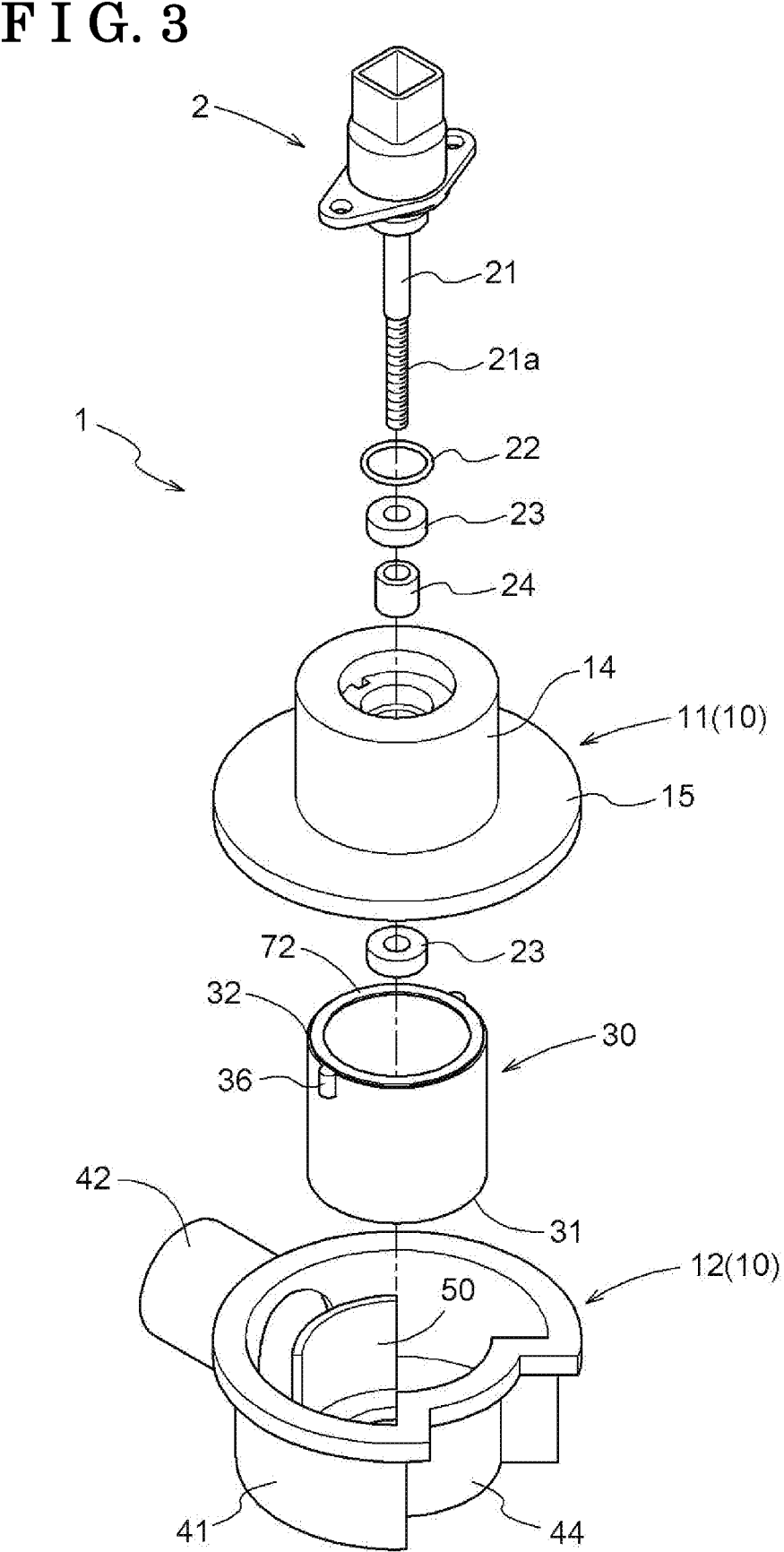
FIG. 3 is an exploded perspective view of the flow control valve.
Figure 4:
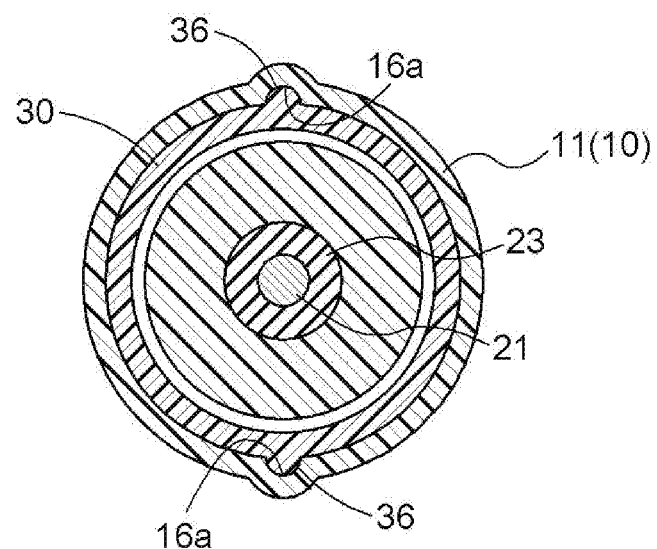
FIG. 4 is a cross-sectional view taken along a line IV-IV in FIG. 1.

As illustrated in FIGS. 3 and 4, the cylindrical valve body 30 includes an outer peripheral surface 30a at which two protruding portions 36 are provided and positioned opposing each other relative to the axis X in the vicinity of the second end surface 32. In addition, recess portions 16a are provided at the groove portion 16 of the first housing 11 so as to be configured to make contact or engage with the respective protruding portions 36. The valve body 30 is inhibited from rotating in a circumferential direction thereof by a contact of each of the protruding portions 36 with the recess portion 16a. Accordingly, even when the externally threaded portion of the end portion 21a rotates because of rotational driving of the shaft 21 of the motor portion 2, the internal threaded portion of the annular portion 33 which is meshed with the externally threaded portion of the end portion 21a of the shaft 21 is inhibited from rotating. The rotational driving of the shaft 21 is converted to a linear movement of the annular portion 33 along the axis X, which leads to a linear movement of the valve body 30 in the direction of the axis X.

In order to bring the flow control valve 1 from the closed state as illustrated in FIG. 1 to the open state as illustrated in FIG. 2, the motor portion 2 is driven to rotate the shaft 21 in a forward direction, for example. The annular portion 33 is then meshed with the end portion 21a of the shaft 21 towards a base side thereof so that the valve body 30 moves in an open direction. As a result, the flow control valve 1 is brought to the open state as illustrated in FIG. 2 where the inflow port 25 and the outflow port 26 communicate with each other. The cooling water flows from the inflow port 25 to the outflow port 26 accordingly. In the flow control valve 1, the flow rate of the cooling water may be easily controlled by an adjustment of a flow path area between the inflow port 25 and the outflow port 26, which is achieved by changing the position of the valve body 30 in a state where the flow control valve 1 is in the open state.

In order to switch the flow control valve 1 from the open state as illustrated in FIG. 2 to the closed state as illustrated in FIG. 1, the motor portion 2 is driven to rotate the shaft 21 in an opposite direction to the forward direction. The annular portion 33 is then meshed with the end portion 21a of the shaft 21 towards a tip end side thereof so that the valve body 30 moves in a closed direction. Afterwards, the valve body 30 makes contact with the bottom portion 41a of the accommodation portion 41 of the second housing 12 to thereby close a flow path between the inflow port 25 and the outflow port 26. The flow control valve 1 is brought to the closed state accordingly.

During a transition of the flow control valve from the closed state to the open state, highly pressurized cooling water may be supplied from the water pump towards the outer peripheral surface of the valve body. The water pressure of the cooling water may be a large load upon movement of the valve body. Therefore, according to the flow control valve 1 of the present embodiment, a partition wall 50 is provided between the valve body 30 and the inflow port 25. The partition wall 50 is provided in a standing manner, i.e., extending in a substantially up-down direction, at the bottom portion 41a of the accommodation portion 41 of the second housing 12. The partition wall 50 is formed extending along the outer peripheral surface 30a of the valve body 30 in a planar view. A flow path from the inflow port 25 to the valve body 30 is branched or diverted towards the outer peripheral side of the valve body 30 by means of the partition wall 50.

Accordingly, because of the partition wall 50 in the flow control valve 1, the cooling water flowing from the inflow port 25 to the valve body 30 is inhibited from making direct contact with the valve body 30 by means of the partition wall 50 and is diverted or branched towards the outer peripheral side of the valve body 30 to flow over the outer peripheral side thereof. Thus, the water pressure received by the valve body 30 when the cooling water is supplied from the inflow port 25 may be reduced, which may decrease a load caused by the water pressure of the cooling water during the movement of the valve body 30. As a result, a driving torque necessary for the motor portion 2 may be reduced, which may lead to downsizing of the motor portion 2. In addition, a load during the movement of the valve body 30 may be reduced by a simple construction where the partition wall 50 is provided between the valve body 30 and the inflow port 25.

As illustrated in FIG. 5, a width of the partition wall 50 in a direction orthogonal to a flow direction of the cooling water which flows from the inflow port 25 is longer than a flow path width of the inflow port 25 in a planar view. Thus, the water pressure of the cooling water from the inflow port 25 is inhibited from being directly applied or influencing the outer peripheral surface 30a of the valve body 30. The aforementioned width of the partition wall 50 may be equal to or smaller than the flow path width of the inflow port 25.

The flow path from the inflow port 25 to the valve body 30 is branched by the partition wall 50 into a first flow path 61 and a second flow path 62 between the outer peripheral surface 30a of the valve body 30 and an inner surface 10a of the housing 10. That is, the flow path branched by the partition wall 50 is constituted or formed as the first flow path 61 and the second flow path 62 between the outer peripheral surface 30a of the valve body 30 and the inner surface 10a of the housing 10. The first flow path 61 and the second flow path 62 are positioned symmetrical to each other with reference to the axis X. The first flow path 61 and the second flow path 62 are constructed so that flow path areas thereof are equal to each other and flow path lengths thereof are equal to each other in a case where the flow control valve 1 is in the closed state (i.e., the valve body 30 is at the closed position). Accordingly, the water pressure applied to the outer peripheral surface 30a of the valve body 30 from the cooling water flowing through the first flow path 61 and the water pressure applied to the outer peripheral surface 30a of the valve body 30 from the cooling water flowing through the second flow path 62 are balanced out (cancelled out).

In a case where the valve body 30 is opened (i.e., the flow control valve 1 is in the open state), it is appropriate that a sum of a first flow path area S1 of the first flow path 61 and a second flow path area S2 of the second flow path 62 may be equal to or greater than a flow path area S of the inflow port 25. The first flow path area S1 and the second flow path area S2 are defined as cross-sectional areas of regions in the flow path between a first wall portion 51 serving as a first portion of the partition wall 50 (for example, one of right and left portions of the partition wall 50) and the inner surface 10a of the housing 10 and between a second wall portion 52 serving as a second portion of the partition wall 50 (for example, the other of right and left portions of the partition wall 50) and the inner surface 10a of the housing 10. Because of the above setting of the first and second flow path areas S1 and S2, the cooling water may smoothly flow from the inflow port 25 to the first flow path 61 and the second flow path 62 so that pressure loss of the cooling water at the outer peripheral side of the valve body 30 is unlikely to occur.

The second housing 12 includes a first clearance 63 formed between the partition wall 50 and the outer peripheral surface 30a of the valve body 30 and a second clearance 64 formed between the outer peripheral surface 30a of the valve body 30 and the inner surface 10a of the housing 10. The second clearance 64 is positioned symmetrical to the first clearance 63 about the axis X. The second housing 12 includes a cut portion 44 obtained by cutting a circumferential part of the accommodation portion 41 in a direction closer to the outer peripheral surface 30a of the valve body 30. The second clearance 64 is defined by the cut portion 44. The cut portion 44 is provided between the first flow path 61 and the second flow path 62 in the circumferential direction of the valve body 30. The first clearance 63 and the second clearance 64 are configured in a manner that radial lengths thereof are equal to each other and circumferential lengths thereof are equal to each other. Accordingly, the water pressure applied to the outer peripheral surface 30a of the valve body 30 by the cooling water flowing to the first clearance 63 and the water pressure applied to the outer peripheral surface 30a of the valve body 30 by the cooling water flowing to the second clearance 64 are balanced out. Because the water pressure is canceled out at a portion in the outer peripheral surface 30a of the valve body 30, the valve body 30 is inhibited from inclining relative to the axis X by the water pressure of the cooling water in a case where the valve body 30 moves for bringing the flow control valve 1 from the closed state to the open state. The valve body 30 is thus appropriately movable.

Figure 6:
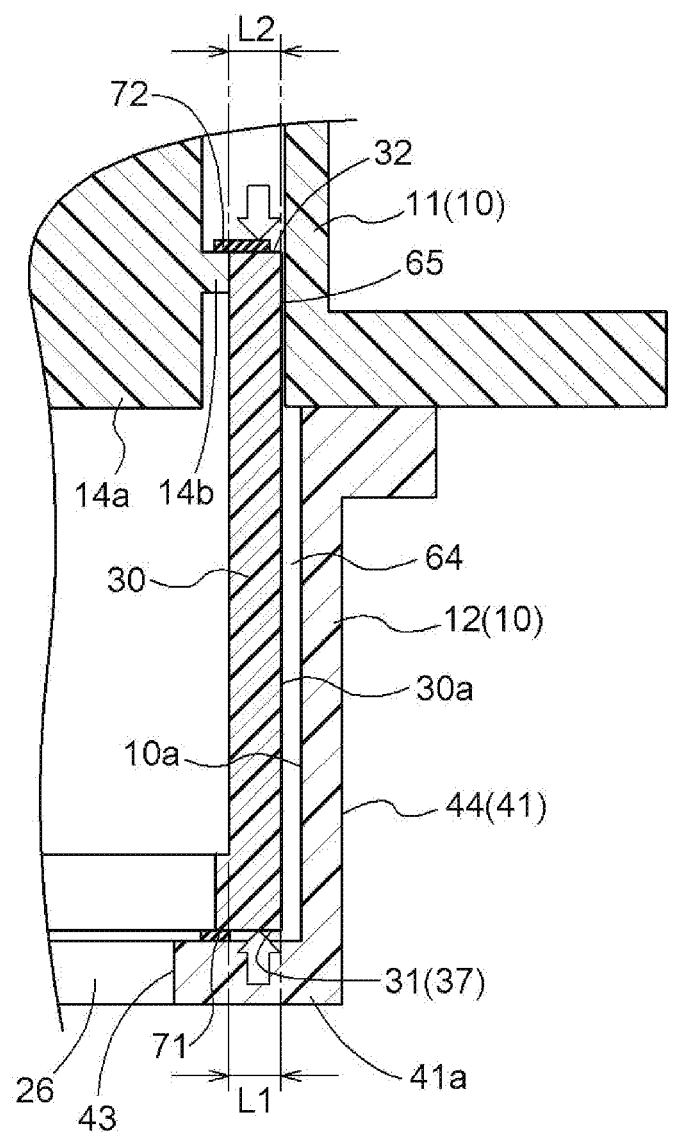
FIG. 6 is a cross-sectional view of a main portion of the flow control valve.

As illustrated in FIG. 6, the valve body 30 includes a first surface seal 71 in an annular form at the first end surface 31 which is positioned facing the outflow port 26 (the inflow port 25). The first surface seal 71 which is coaxial with the axis X includes a smaller diameter than an outer diameter of the valve body 30. The valve body 30 also includes a second surface seal 72 in an annular form at the second end surface 32 which is positioned opposite to the outflow port 26 (the inflow port 25). The first surface seal 71 tightly seals and closes between the first end surface 31 of the valve body 30 and the bottom portion 41a of the accommodation portion 41 of the second housing 12 in a state where the valve body 30 is closed so as to close the outflow port 26. The second surface seal 72 tightly seals and closes between the second end surface 32 of the valve body 30 and a flange portion 14b provided at the shaft holding portion 14a of the first housing 11 in a state where the valve body 30 is closed. In a state where the valve body 30 blocks and closes the outflow port 26 by the first surface seal 71, a flow path 65 is formed between the outer peripheral surface 30a of the valve body 30 and an inner surface of the first housing 11 facing the valve body 30, the flow path 65 through which the cooling water flows to the second end surface 32 of the valve body 30. In addition, a radial length of an outer circumferential surface of the flange portion 14b of the shaft holding portion 14a from the axis X and a radial length of an outer circumferential surface of the first surface seal 71 from the axis X are equal to each other. Thus, the cooling water flows through the flow path 65 to fill the inside of the groove portion 16 in a state where the valve body 30 is closed so as to apply the water pressure to the second surface seal 72.

According to the aforementioned construction, the first surface seal 71 provided at the first end surface 31 and the second surface seal 72 provided at the second end surface 32 make contact with and separate from the inner surface 10a of the housing 10 and is inhibited from sliding with the inner surface 10a of the housing 10. Thus, the first surface seal 71 and the second surface seal 72 are unlikely to be abraded, which leads to improved durability.

The valve body 30 is constructed so that a radial length L1 of an annular part 37 in the first end surface 31, the annular part 37 being positioned at a radially outer side than the first surface seal 71, is equal to a radial length L2 of the second end surface 32. Thus, because an area of the annular part 37 and an area of the second end surface 32 are equal to each other, the water pressure applied to the first end surface 31 and the water pressure applied to the second end surface 32 in the valve body 30 are balanced out. As a result, the water pressure which disturbs the movement of the valve body 30 in a case where the valve body 30 moves from the open position to the closed position (i.e., the flow control valve 1 is brought from the open state to the closed state) is reduced or eliminated, which may decrease the driving force of the motor portion 2.

In the aforementioned embodiment, the protruding portions 36 are provided at the outer peripheral surface 30a of the valve body 30 and the recess portions 16a are provided at the housing 10 so that the protruding portions 36 are configured to make contact or engage with the recess portions 16a as the construction for inhibiting the rotation of the cylindrical valve body 30 relative to the housing 10. At this time, the construction for inhibiting the rotation of the cylindrical valve body 30 relative to the housing 10 is not limited to the protruding portions 36 and the recess portions 16a. For example, a recess portion may be provided at the outer peripheral surface 30a of the valve body 30 and a protruding portion may be provided at the housing 10 so that the protruding portion is configured to make contact or engage with the recess portion, or different construction may be employed.

The aforementioned embodiment is widely applicable to a flow control valve of cooing water, for example.

According to the aforementioned embodiment, a flow control valve 1 includes a housing 10 including an inflow port 25 and an outflow port 26 which communicates with the inflow port 25, a valve body 30 housed in the housing 10 and formed in a cylindrical form, the valve body 30 allowing and prohibiting cooling water (fluid) to flow between the inflow port 25 and the outflow port 26 by moving in an axial direction, a motor portion 2 (actuator) moving the valve body 30 in the axial direction, and a partition wall 50 arranged between the valve body 30 and the inflow port 25 and causing a flow path from the inflow port 25 to the valve body 30 to be branched towards an outer peripheral side of the valve body 30.

Accordingly, the cooling water flowing from the inflow port 25 to the valve body 30 is inhibited from making direct contact with the valve body 30 by means of the partition wall 50 and is branched or diverted towards the outer peripheral side of the valve body 30 to flow over the outer peripheral side thereof. Thus, the water pressure received by the valve body 30 when the cooling water is supplied from the inflow port 25 may be reduced, which may decrease a load caused by the water pressure of the cooling water during the movement of the valve body 30. As a result, a driving torque necessary for the motor portion 2 may be reduced, which may lead to downsizing of the motor portion 2. In addition, a load during the movement of the valve body 30 may be reduced by a simple construction where the partition wall 50 is simply provided between the valve body 30 and the inflow port 25.

In addition, according to the embodiment, the flow path branched by the partition wall 50 into a first flow path 61 and a second flow path 62 are formed between an outer peripheral surface 30a of the valve body 30 and an inner surface 10a of the housing 10. The first flow path 61 and the second flow path 62 include respective flow path areas equal to each other and respective flow path lengths equal to each other.

According to the aforementioned construction, the water pressure applied to the valve body 30 by the cooling water flowing through the first flow path 61 and the water pressure applied to the valve body 30 by the cooling water flowing through the second flow path 62 may be equalized to each other. Thus, because of the flow paths 61, 62 formed between the outer peripheral surface 30a of the valve body 30 and the inner surface 10a of the housing 10, a sliding resistance is inhibited from being generated between the valve body 30 and the housing 10 while the valve body 30 is moving in the axial direction. As a result, a driving force of the motor portion 2 for moving the valve body 30 may be reduced.

In addition, according to the embodiment, the housing 10 includes a cut portion 44 between the first flow path 61 and the second flow path 62 in a circumferential direction of the valve body 30.

Accordingly, while the flow path areas are equal to each other and the flow path lengths are equal to each other between the first flow path 61 and the second flow path 62, an inner void of the housing 10, i.e., a void through which the cooling water flows, may be reduced. The flow control valve 1 may be downsized and lightweight of the flow control valve 1 including the cooling water is obtainable.

In addition, according to the embodiment, the inflow control valve 1 further includes a first clearance 63 provided between the partition wall 50 and an outer peripheral surface 30a of the valve body 30, and a second clearance 64 provided between the outer peripheral surface 30a of the valve body 30 and the inner surface 10a of the housing 10, the second clearance 64 being positioned symmetrical to the first clearance 63 with reference to an axis X of the valve body 30, the first clearance 63 and the second clearance 64 including respective radial lengths equal to each other and respective circumferential lengths equal to each other.

Accordingly, the water pressures in regions facing each other at the outer peripheral side of the valve body 30 may be equalized with each other. As a result, the driving force of the motor portion 2 for moving the valve body 30 may be reduced.

In addition, according to the embodiment, the valve body 30 includes a first surface seal 71 in an annular form and a second surface seal 72 in an annular form at opposed end surfaces in the axial direction, the opposed end surfaces including a first end surface 31 which is positioned facing the inflow port 25 and a second end surface 32 which is positioned opposite to the inflow port 25, the first surface seal 71 being provided at the first end surface 31 and including a smaller diameter than an outer diameter of the valve body 30, the second surface seal 72 being provided at the second end surface 32. A flow path 65 is provided between an outer peripheral surface 30a of the valve body 30 and an inner surface 10a of the housing 10, the flow path 65 through which the cooling water flows to the first end surface 31 and the second end surface 32 of the valve body 30 in a state where the valve body 30 blocks the outflow port 26 by the first surface seal 71.

Accordingly, the first surface seal 71 and the second surface seal 72 make contact with or separate from the inner surface 10a of the housing 10 with the movement of the valve body 30. The first surface seal 71 and the second surface seal 72 are inhibited from sliding on the inner surface 10a of the housing 10. Thus, the first surface seal 71 and the second surface seal 72 are difficult to be abraded, which improves durability of the first surface seal 71 and the second surface seal 72.

In addition, according to the embodiment, the first end surface 31 of the valve body 30 includes an annular part 37 which is positioned at a radially outer side than the first surface seal 71, an area of the annular part 37 being configured to be equal to an area of the second end surface 32.

Accordingly, the water pressure applied to the annular part 37 of the first end surface 31 and the water pressure applied to the second end surface 32 may be balanced out. Thus, the driving force of the motor portion 2 for moving the valve body 30 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A flow control valve comprising:
a housing including an inflow port and an outflow port which communicates with the inflow port;
a valve body housed in the housing and formed in a cylindrical form, the valve body allowing and prohibiting a fluid to flow between the inflow port and the outflow port by moving in an axial direction;
an actuator moving the valve body in the axial direction; and
a partition wall arranged between the valve body and the inflow port and causing a flow path from the inflow port to the valve body to be branched towards an outer peripheral side of the valve body,
wherein the partition wall includes a wall surface extending in a direction orthogonal to a flow direction of the cooling water which flows from the inflow port.

2. The inflow control valve according to claim 1, wherein the flow path branched by the partition wall into a first flow path and a second flow path are formed between an outer peripheral surface of the valve body and an inner surface of the housing,
the first flow path and the second flow path include respective flow path areas equal to each other and respective flow path lengths equal to each other.

3. The inflow control valve according to claim 2, wherein the housing includes a cut portion between the first flow path and the second flow path in a circumferential direction of the valve body.

4. The inflow control valve according to claim 1, further comprising:
a first clearance provided between the partition wall and an outer peripheral surface of the valve body; and
a second clearance provided between the outer peripheral surface of the valve body and the inner surface of the housing, the second clearance being positioned symmetrical to the first clearance with reference to an axis of the valve body,
the first clearance and the second clearance include respective radial lengths equal to each other and respective circumferential lengths equal to each other.

5. The inflow control valve according to claim 1, wherein the valve body includes a first surface seal in an annular form and a second surface seal in an annular form at opposed end surfaces in the axial direction, the opposed end surfaces including a first end surface which is positioned facing the inflow port and a second end surface which is positioned opposite to the inflow port, the first surface seal being provided at the first end surface and including a smaller diameter than an outer diameter of the valve body, the second surface seal being provided at the second end surface,
a flow path is provided between an outer peripheral surface of the valve body and an inner surface of the housing, the flow path through which a fluid flows to the first end surface and the second end surface of the valve body in a state where the valve body blocks the outflow port by the first surface seal.

6. The inflow control valve according to claim 5, wherein the first end surface of the valve body includes an annular part which is positioned at a radially outer side than the first surface seal, an area of the annular part being configured to be equal to an area of the second end surface.

7. The inflow control valve according to claim 1, wherein a width of the partition wall in the direction orthogonal to the flow direction of the cooling water which flows from the inflow port is greater than a flow path width of the inflow port.

8. The inflow control valve according to claim 1, wherein the housing includes an accommodation portion which accommodates the valve body in a case where the flow control valve is in a closed state, and the partition wall is provided in a standing manner at a bottom portion of the accommodation portion of the housing.

* * * * *